Oct. 20, 1959        F. E. WILLIAMS        2,909,703
RADIANT ENERGY INTENSIFICATION SYSTEM AND METHOD
Filed Sept. 12, 1955
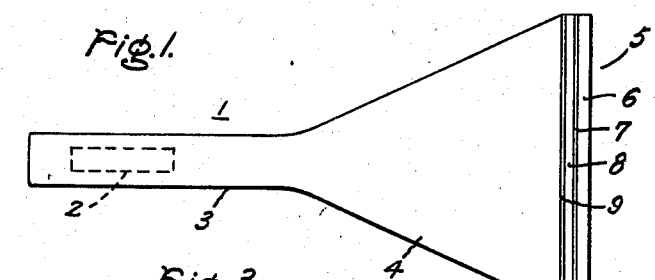
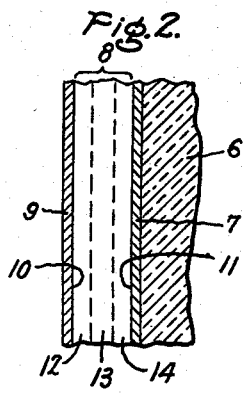
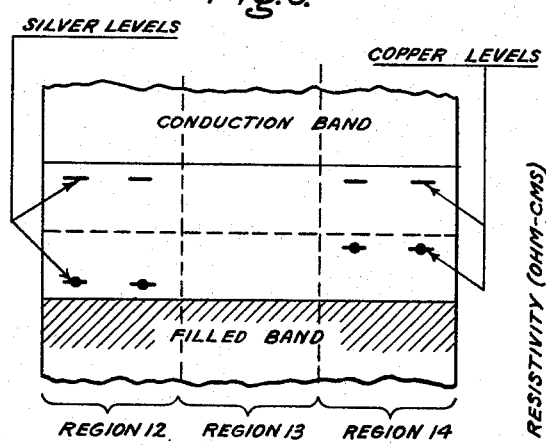
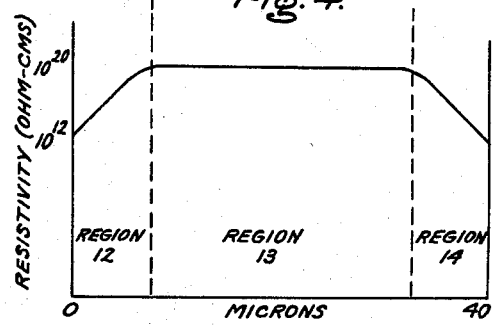
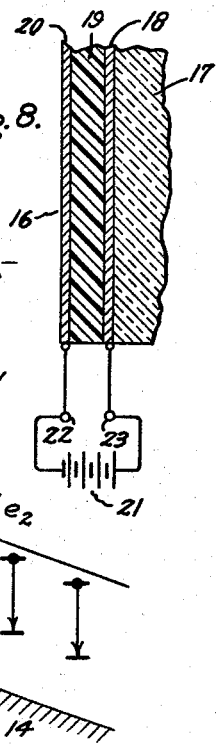
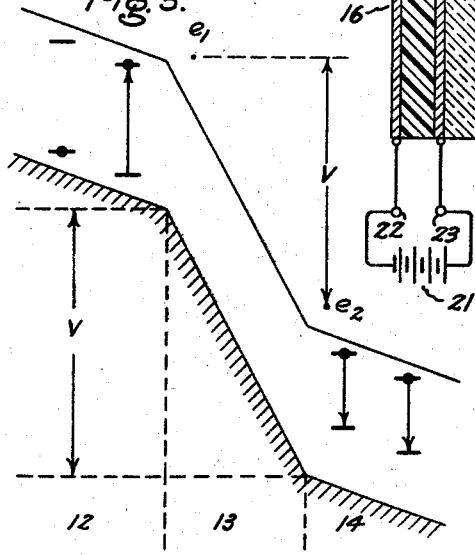
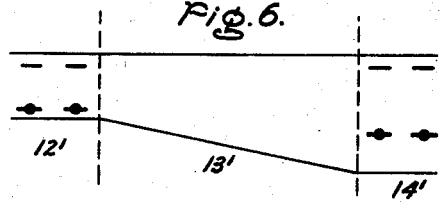
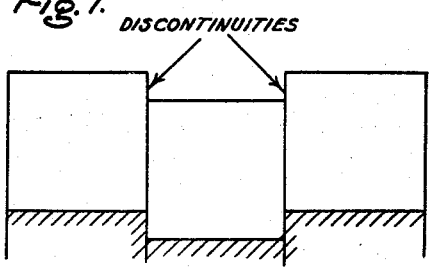
Inventor:
Ferd E. Williams,
by Paul A. Frank
His Attorney.

United States Patent Office 2,909,703
Patented Oct. 20, 1959

2,909,703

RADIANT ENERGY INTENSIFICATION SYSTEM AND METHOD

Ferd E. Williams, Scotia, N.Y., assignor to General Electric Company, a corporation of New York Application September 12, 1955, Serial No. 533,833

14 Claims. (Cl. 315—10)

This invention pertains to information portraying systems, and more particularly, to such systems in which a luminescent solid is excited to luminescence by incident radiant energy. This application is a continuation-in-part of my copending application, Serial No. 451,583, filed August 23, 1954 assigned to the same assignee as the present invention and now abandoned.

It is well known to the art that luminescent solids may be excited to luminescence by incident radiant energy of various types. Solid state luminescence may be excited by such forms of radiant energy as X-rays, ultraviolet and visible light, and cathode rays or electron beams. Information portraying systems in which solid luminescent materials are excited to luminescence by the above-mentioned forms of radiant energy in general suffer from the disadvantage that the intensity of light emitted by the luminescent solids is so limited that less radiant energy may be emitted from the luminescent solid than is received. This limitation is due primarily to the fact that the energy which produces luminescence from solid luminescent materials in conventional systems is derived from the source of excitation. Since the processes of solid state luminescence are always less than 100% efficient, it is impossible, by conventional radiation excited luminescent systems, to derive any amplification from a solid luminescent material.

There are, in addition, other limitations upon the intensity of emitted light which may be derived from radiant energy excited luminescent information portraying systems and light sources. In the case of X-ray excited luminescent systems, the beam of X-ray energy passing through a human patient must necessarily be kept at a low intensity in order to prevent injury to the patient. In the case of cathode ray excited luminescence, a limitation arises from the fact that high intensity electron beams focused upon a solid luminescent material cause destruction of the luminescent screen. In addition, with cathode ray excitation, as in a television or radar system, high voltage capable of modulation at megacycle frequencies must be used; and high intensity excitation by this method requires complex power supplies. A limitation on the intensity obtainable from ultraviolet and visible light excited solid luminescent systems arises from the difficulty of achieving the extremely high intensity light necessary to cause high intensity luminescence. Additionally, when high power is derived from visible light or ultraviolet light sources, complicated systems of cooling are necessary in order to prevent damage due to overheating of the apparatus.

An object of the invention, therefore, is to produce solid state luminescent information portraying systems which are not subject to the above-mentioned disadvantages.

Another object of the invention is to provide a method and means for intensifying radiant energy excited solid state luminescence.

Still another object of the invention is to provide solid state luminescent light production systems which are capable of amplifying received information carrying signals.

A further object of the invention is to provide solid state luminescent light production and information portraying systems for providing high intensity visual images from low intensity radiant energy signals.

In accordance with my invention, high intensity visible light may be produced from a semiconducting luminescent solid which is irradiated by low intensity radiation from X-rays, ultraviolet rays, visible light or cathode rays. In general, in practicing my invention, a semiconducting phosphor is subjected to an electric field which raises the energy state of the phosphor slightly below the threshold of luminescence. When radiant energy in the form of X-rays, ultraviolet or visible light, or cathode rays is incident upon the cathodo or photoluminescent phosphor of the invention, the incident radiation acts as a signal to raise the energy level of the luminescent phosphor above the threshold of luminescence, causing high intensity light to be emitted therefrom. Amplification of light intensity may be obtained from the systems of my invention because the incident radiant energy acts only as a triggering signal to control luminescence rather than a source of power for the excitation of luminescence. Power to sustain luminescence is obtained from the impressed electric field. For the purposes of this specification, radiant energy may be defined as including X-rays, visible and ultraviolet light, and cathode rays or electron beams. The screens used in the practice of this invention may be either photoluminescent or cathodoluminescent.

The features of my invention which I believe to be novel are set forth with particularity in the appended claims. My invention itself, however, both as to its organization and methods of operation, together with further objects and advantages thereof, may best be understood by reference to the following description, taken in connection with the following drawings, in which:

Fig. 1 shows one embodiment of the invention;

Fig. 2 shows a partial cross-section of the luminescent screen in the device of Fig 1;

Figs. 3, 4, 5, 6 and 7 are energy level diagrams helpful in understanding the operation of the invention, and Fig. 8 illustrates a further embodiment of the invention.

While my invention is directed to systems in which the above-mentioned types of radiant energy are used to excite a luminescent solid, for purposes of clarity in describing the operation of the invention, particularly with respect to prior art systems, the invention will be described specifically with regard to a system in which a cathodoluminescent screen is excited to luminescence by a stream of electrons or cathode rays.

In the operation of conventional systems involving the phenomenon of cathodoluminescence, a luminescent phosphor screen possessing a number of centers of activation is directly bombarded by incident cathode rays. The stream of incident cathode rays or electrons impinges upon the cathodoluminescent phosphor and the energy of the impinging electrons is transferred, by electron interaction, to the centers of activation. When a center of activation is acted upon by an impinging electron, the electronic configuration of the activation center changes to that of a higher energy level. After a given length of time, the energy of the center of activation falls to a lower energy level and a photon of visible light is emitted. This type of cathodoluminescent excitation is limited in efficiency in that each impinging electron excites only a limited number of centers of activation, dependent on the kinetic energy of the impinging electron. In addition, the efficiency of conventional cathodoluminescent screens is quite low and the emitted energy output is substantially lower than the energy of the incident electron beam.

In practicing my invention, the efficiency of conversion of incident radiant energy into luminescence is increased greatly by impressing upon the phosphor layer which comprises the luminescent screen an electric field, either unidirectional or alternating. Additionally, the phosphor layer is made sufficiently thick so that electrons raised in energy by incident radiation may migrate through a region of phosphor, gaining sufficient energy from the impressed electric field to cause ionization of other atoms and the subsequent creation of a greater number of free electrons. This greater number of free electrons finally interacts with activation centers, causing the emission of a large number of photons of visible light. The luminescent screens of my system, while consisting of a single continuous phosphor layer, preferably comprise three regions, each of which possesses different electrical and optical characteristics, and is particularly suited to perform a particular function in the process of transforming incident electron energy and the energy of the applied electrical potential into luminescent energy. The term "continuous phosphor layer," as herein used, connotes that the layer is composed entirely of crystalline phosphor material as opposed to conventional phosphor screens in which individual phosphor particles are suspended in a dielectric medium.

The first region of the phosphor layer of my improved system comprises a region of phosphor having the property of a high efficiency of conversion of incident electrons into electron-hole pairs. Thus, a large number of incident electrons will be effective to convert electron hole pairs in the first region. The second region, or intermediate region, of the phosphor layer is of a high purity phosphor having a high resistivity so that the field impressed upon the phosphor layer is concentrated in the intermediate or second region. Electrons energized in the first region advance through the second or intermediate region under the influence of the impressed electric field, and by inelastic collisions create an avalanche of free electrons, multiplying the number of free electrons within the phosphor by a large factor. The electron avalanche created within the second or intermediate region is drawn, under the influence of the impressed electric field, into the third region, which comprises a region having a high concentration of luminescence activation centers. The electrons energized within the intermediate region interact with the centers of activation in the third region causing excitation of these activation centers and the subsequent emission of many photons of visible light. Thus, for each electron incident upon the first region of the phosphor layer, a large number of activation centers in the third region of the phosphor layer is activated to luminescence and the information impressed upon the incident electron beam is transformed into a visible presentation amplified to high intensity.

In order that electrons energized in the first region of the composite phosphor layer may be able to move freely through the phosphor and eventually excite centers of activation, it is necessary that there be no marked discontinuities in electrical properties within the phosphor layer. Thus, while the electrical characteristics of the phosphor layer vary from region to region, the variation must be gradual so as not to impede the progress of electrons through the phosphor layer. This may be expressed by the requirement that there be a monotonic variation in electrical properties throughout the composite phosphor layers. The conditions of a monotonic variation in electrical properties are two, namely: First, that the number of electron states of a given energy per unit volume as a function of energy varies gradually with position and, second, that the number of electrons per unit volume also varies gradually. These requirements, when satisfied, produce the concrete result that there are no discontinuities in the variation of bulk resistivity through the phosphor layer from region to region. If the variation of electrical properties and, hence, bulk resistivity, from one region of the phosphor layer to another is not gradual, electrons will not be able to make the transition from one region to another, and there will be a resultant build-up of charge at the interface between adjacent regions, and little, if any, luminescence will be produced. It follows also that there may be no substantial discontinuities in electrical properties, including bulk resistivity, within any one given region. For this reason, conventional suspended powder phosphor films may not be used. My systems operate only with continuous, non-granular phosphors as is hereinafter described.

Referring now to the drawing, there is shown in Fig. 1 one embodiment of my invention. In Fig. 1 a cathode ray tube, represented generally as 1, includes an electron gun 2 located within neck piece 3 of glass envelope 4. Cathodoluminescent screen 5, which may be activated to luminescence by bombardment with cathode rays or electrons from electron gun 2, is located at the end of glass envelope 4 opposite electron gun 2.

In Fig. 2 there is shown an enlarged cross-section of a portion of luminescent screen 5 which comprises a glass plate 6, a transparent conducting layer 7, which may conveniently be a conducting layer of titanium dioxide as disclosed and claimed in the copending application of Cusano and Studer, Serial No. 243,271, filed August 23, 1951, and assigned to the same assignee as the present invention, luminescent phosphor layer 8, and a thin metallic conducting film 9. Phosphor layer 8 comprises a continuous non-granular layer of a cathodo-luminescent phosphor which may, for example, be zinc sulphide, having therein three regions of substantially equal thickness and of varying electrical characteristics but having a gradual and continuous variation in electrical characteristic from region to region so that there is no discontinuity in electrical characteristics, including bulk resistivity, through the phosphor layer from surface 10 to surface 11. In Fig. 2 the boundaries between adjacent regions are represented as dashed lines since the variation in electrical characteristics from one region to another is gradual and no true interface exists between adjacent regions. Region 12 may comprise a region of zinc sulphide having therein a high concentration of centers of impurity activation which may comprise a plurality of diffused atoms of silver as activator and chlorine as co-activator within the region, the silver and chlorine atoms being most concentrated within the region adjacent surface 10. The diminishing concentration of silver and chlorine activator atoms within region 12 away from surface 10 increases the bulk resistivity of region 12 progressively as the concentration of silver and chlorine atoms decreases. Region 13 may comprise a region of substantially intrinsic high purity, high resistivity zinc sulphide having therein a minimum of impurities. Region 14 may comprise zinc sulphide having therein a large number of luminescent activation centers which may comprise a plurality of diffused copper as activator and chlorine atoms as co-activator with the highest concentration of activation centers in the region adjacent surface 11 of layer 8. Because of the presence of activation centers within region 14, the resistivity of region 14 will be lowest at surface 11 and progressively increase with distance from surface 11. The variations in electrical characteristics and the presence of varying impurity activators may be attained in phosphor layer 8 according to well-known methods by first vapor-depositing a thin film of the order of 0.01 micron thick of copper chloride upon the face of glass plate 6 before the deposition of phosphor layer 8. Phosphor layer 8 may then be formed upon the copper chloride layer by the method described and claimed in Patent 2,675,331, Cusano and Studer.

According to this method, a thin, continuous, transparent film of zinc sulphide phosphor may be deposited upon glass plate 6 by the interaction of zinc sulphide vapor and hydrogen sulphide gas in the vapor phase causing the deposition of zinc sulphide upon the glass plate. After the deposition of phosphor layer 8, a thin layer of silver chloride may be sprayed or vapor-deposited upon the surface 10 of phosphor layer 8 according to well-known techniques. After the formation of the various films upon the glass plate, the entire assembly may then be placed in an oven and heated for a sufficient time to cause copper and chlorine activator atoms to diffuse from surface 11 into region 14 of phosphor layer 8 (causing the absorption of the thin copper chloride film into phosphor film 8) and silver and chlorine atoms to diffuse from film 9 through surface 10 into region 12 of phosphor layer 8. This time may be approximately one-half hour and may be conducted at a temperature of approximately 1100° C.

The electrical characteristics of phosphor layer 8 of Figure 2 may be described graphically with reference to Figures 3 through 7 in which there are shown energy level diagrams for phosphor layer 8.

Figure 3 represents an energy level scheme for a composite zinc sulphide film having three regions as hereinbefore described. This diagram represents the electronic conduction characteristics of the film with no electric potential applied thereto. Region 12 is impregnated with a varying concentration of silver and chlorine co-activator atoms and region 14 is impregnated with a varying concentration of copper and chlorine co-activator atoms. Although chlorine acts as a co-activator with silver in region 12, and with copper in region 14, the characteristics of activation (e.g., the position of the induced energy levels therein) is dependent principally upon the metallic activator atom. For this reason, in Figure 3 and the description thereof, the impurity induced levels are referred to as silver levels and copper levels respectively. As may be seen, the silver and copper atoms each introduce two energy levels within the forbidden band which lie between the conduction band and the valence or filled band. In the energy level diagram of Figure 3 the valence band represents the energies of the electrons bound to the atoms of the crystal lattice. The conduction band in such an energy level diagram represents a continuum of electron energies within which electrons may move as current carriers. The forbidden band of such an energy level diagram represents the band of energies lying between the valence and conduction bands, which energies may not be occupied by electrons from the crystal lattice in the absence of lattice imperfections or chemical impurities such as those which give rise to centers of activation. It may be noted that due to the continuous variation of electrical characteristics across the three zones of the phosphor layer there are no discontinuities or impedance mismatches between regions 12, 13 and 14 preventing the free passage of conduction electrons from one region to another. The lower of the two induced energy levels introduced by the silver atoms in region 12 is relatively close to the valence band. Such an energy state represents a high excitation potential for the centers of activation. This arrangement of induced impurity levels is ideally suited for the creation of electron-hole pairs by the impingement of incident radiant energy. The impurity levels introduced by the copper atoms in region 14 represent a lower excitation potential and, while not well suited for the creation of electron-hole pairs, are well suited for the absorption of energy and subsequent re-emission of the absorbed energy to produce photons of visible light.

Figure 4 shows graphically the variation of bulk resistivity through phosphor layer 8 from surface 10 to surface 11. At surface 10, represented by zero distance through the phosphor layer, the bulk resistivity of the phosphor is lowest, of the order of $10^{12}$ ohm-centimeters, due to the presence of a high concentration of silver activator and chlorine co-activator atoms. Passing into the body of phosphor layer 8, the bulk resistivity of region 12 increases with decreasing silver activator and chlorine co-activator atom concentration. At the arbitrarily selected boundary between regions 12 and 13, bulk resistivity has reached a maximum, of the order of $10^{20}$ ohm-centimeters, and remains at this value throughout region 13. At the arbitrary boundary between regions 13 and 14 the bulk resistivity begins to decrease due to the presence of copper activator and chlorine co-activator atoms in region 14, and reaches its lowest value at surface 11 of the phosphor layer. Thus, it may be seen that, although the bulk resistivity of phosphor layer 8 varies with position, the variation is gradual, and there are no substantial discontinuities to prevent the migration of electrons through the phosphor under the influence of the impressed electric field.

Figure 5 is an energy level diagram for the composite phosphor layer when an electric potential is applied between the two opposite surfaces thereof. In Figure 5, the levels of the valence and conduction bands at the interface between regions 12 and 13 are separated from the levels of the valence and conduction bands at the interface between regions 13 and 14 by a distance which is representative of the voltage across region 13. When a photon of radiant energy or an electron enters into the lattice structure of region 12 and transfers energy to an electron in one of the silver activated levels within the forbidden band, the electron at that level gains sufficient thermal energy to be raised into the conduction band and to leave its associated activation center. Under the influence of the impressed electric field, the freed electron migrates down the potential gradient from region 12 through region 13 and into region 14, all the while gaining an amount of energy equivalent to the voltage through which it has fallen represented, for example, on the diagram by the difference in the vertical distance between points $e_1$ and $e_2$. During its passage through region 13 the electron may make inelastic collisions with atoms of the lattice freeing electrons therefrom and causing an avalanche of conduction electrons, or may maintain all of its energy until it enters region 14. The probability, however, is that many electrons will be freed by inelastic collisions. When the freed electrons have moved into region 14, they may again interact with impurity activation centers, losing energy and raising the energy of the copper induced activation centers to the upper copper energy level. When at a later time the activation centers again return to the lower copper energy level a photon of visible light is emitted which corresponds to the energy difference between the upper and lower copper energy levels.

The multiplication of electronic charge within the phosphor layer as described according to the diagrams of Figure 3 and Figure 5 is possible only when there is no electrical discontinuity between adjacent regions 12, 13 and 14. If such a discontinuity exists as is shown in Figure 7 wherein two unlike layers are contiguous it may be seen that a potential barrier is imposed between the adjacent regions preventing the migration of electrons from one region to another. The same type of energy level diagram discontinuities as illustrated in Figure 7 also exists within phosphor layers of the conventional type in which minute particles of a phosphor are suspended within a dielectric medium. Due to the presence of many such discontinuities, it is readily evident that such suspended particle phosphor films will not function effectively as the films of this invention which must be continuous.

In Figure 6, there is shown an energy level diagram for a system in which the change from one region to another includes also a change in constituent material. Thus, in Figure 6, region 12′ may comprise cadmium sulphide, region 13′ may comprise a gradually varying mixture of cadmium sulphide, and zinc sulphide, and region 14′ may comprise a region of zinc sulphide. As may be seen, with no electrical potential applied to the phosphor, the level of the valence band in the cadmium sulphide configuration is higher than the level of the valence band in the zinc sulphide configuration. However, since there is a gradual transition within region 13' from one level to another, there exists no potential barrier which may prevent the migration of electrons under the influence of an applied electric field.

The luminescent screen as described with reference to Figure 2, having the characteristics aforementioned and illustrated in Figures 3 through 6, may be inserted in the face of cathode ray tube 1 to form an operative, light-production and enhancement system as illustrated in Figure 1. To operate the device of Figure 1, a potential difference is maintained between conducting film 7 and metallic film 9 so that an electric field, either unidirectional or alternating, is impressed upon phosphor layer 8. The usual focusing and accelerating potentials are applied to electron gun 2 to cause a stream of electrons to be formed and focused upon screen 5 of cathode ray tube 1. The impinging electrons pass through the thin metallic film 9, which is transparent to electrons, and impinge upon region 12 of phosphor layer 8 which may conveniently comprise zinc sulphide activated at the most heavily impregnated surface adjacent region with from 0.001 to .3% by weight each of silver and chlorine and preferably with 0.01 percent by weight of silver and chlorine causing the creation of a plurality of electron-hole pairs. The electrons freed by the creation of electron-hole pairs are raised to the conduction band and may migrate with the impressed field. Electrons freed in zone 12 are accelerated toward region 13 under the influence of the impressed field of the order of from $10^4$ to $10^7$ volts per centimeter. Electric fields of lower value than $10^4$ volts per centimeter are insufficient to impart sufficient energy to the electrons. Fields higher than $10^6$ volts per centimeter approach the values of the phosphor layer dielectric breakdown strength.

Region 13 may conveniently comprise essentially pure or intrinsic zinc sulphide and the greater portion of the impressed field is concentrated in this region. Under the impetus of the impressed field, the freed electrons undergo inelastic collisions with the atoms of the crystal lattice of region 13 exciting a large number of high energy electrons which are then swept forward under the influence of the impressed field and undergo further inelastic collisions to excite further high energy electrons. Repeated inelastic collisions create an electron avalanche which provides a very large number of high energy electrons which are migrated, under the influence of the impressed field, into region 14 of phosphor layer 8. Region 14 may conveniently comprise a region of zinc sulphide activated with .001 to 0.3% by weight each of silver and chlorine at the most heavily impregnated surface adjacent region, and preferably with approximately 0.1% copper and chlorine, the concentration of activation centers being highest in the vicinity of surface 11 of phosphor 8. Electrons freed by the electron avalanche in zone 13 interact with the activation centers within region 14 raising the centers of activation to high energy levels and causing subsequent photon emission and the resultant emission of visible light energy. The excitation of the activation centers may occur either by inelastic collision by including electrons of high kinetic energy, or by the capture of conduction electrons or positive holes from the valence band.

Thus it may readily be seen that, while the maximum number of photons of radiant energy which may be emitted by a conventional solid luminescent screen under cathode ray bombardment is limited by the kinetic energy of the cathode ray, there is practically no limit to the number of photons per incident electron which may be caused to be emitted by the composite phosphor layers of the invention. The increase in efficiency is due primarily to the fact that the energy input necessary for luminescence is drawn, not from the incident electron beam, but from the electric field which is impressed across the phosphor layer.

While particular activators and coactivators have been disclosed by way of example, the invention is not limited to those shown. Thus, for example, gold and zinc may be substituted, in the same weight percentage, for silver. Likewise, phosphorus, arsenic, antimony or manganese may be substituted, in the same weight percentage, for copper. Additionally, bromine, iodine, gallium or indium may be substituted, in the same weight percentage, for chlorine.

Although the invention has been described with respect to an illustrative example utilizing cathodoluminescence, it may readily be appreciated that incident cathode rays are only one form of radiant energy which may be intensified according to the invention. Thus, the initial creation of electron-hole pairs within region 12 of phosphor 8 may be caused by incident X-rays, by incident ultraviolet rays, or by incident rays of visible light. For maximum efficiency, it is desirable to select the composition of region 12 of phosphor layer 8 in which electron-hole pairs are created to be a phosphor or combination of phosphors which is most productive of electron hole pairs under the chosen type irradiation. Thus, for example, if visible light is to be used as the triggering radiation, phosphor layer 8 may comprise a mixture of zinc and cadmium sulphide crystals with region 12 being entirely cadmium sulphide activated with approximately 0.001 to 0.3% by weight of silver and chlorine or other suitable activator and coactivator combinations as set forth hereinbefore, region 13 being a mixture of unactivated zinc and cadmium sulphide crystals and region 14 comprising zinc sulphide crystals activated with approximately 0.001 to 0.3% by weight of copper and chlorine, or any other suitable activator and coactivator combination as set forth hereinbefore. Cadmium sulphide crystals are particularly efficient sources of electron-hole pairs when irradiated with visible light. The energy level diagram of this system has been shown in Fig. 6. It is to be noted that the variation of electrical properties and chemical constituents of the phosphor layer 8 is gradual from one face of the phosphor layer to the other face thereof, so that the impedance to electrons passing from one region of the phosphor to another region will be a minimum.

If, on the other hand, the incident radiation chosen to create electron-hole pairs is X-radiation, phosphor layer 8 preferably comprises a single crystal or a plurality of properly oriented single crystals of zinc sulphide of the order of 100 to 1,000 microns thick. The single crystal phosphor layer is preferably impregnated along surface 10 with a maximum of 0.001 to 0.3% by weight and preferably with approximately 0.01% by weight each of silver and chlorine activator atoms and along surface 11 with a maximum of 0.001 to 0.3% by weight and preferably with approximately 0.01% by weight each of copper and chlorine activator atoms, forming three regions having different electrical characteristics but with a gradual change from low resistivity, silver and chlorine activated zinc sulphide through substantially pure, high resistivity zinc sulphide to low resistivity, copper and chlorine activated zinc sulphide. Single crystal luminescent films and the method of preparation thereof are described and claimed in the co-pending application of William W. Piper, Serial No. 274,237, filed February 29, 1952, assigned to the same assignee as the present application and now abandoned but patented as Patent No. 2,841,730 which issued upon a continuation thereof. Should the incident radiation be ultra-violet light as, for example, approximately 3650 A.U. radiation, phosphor layer 8 may be substantially the same as that which is used in conjunction with a source of cathode rays, silver and chlorine activated zinc sulphide in region 12, substantially pure zinc sulphide in region 13, and copper and chlorine activated zinc sulphide in region 14 being preferred.

In all cases, no matter which type of radiant energy causes the creation of electron-hole pairs, the variation of electrical characteristics and electrical resistivity from region to region must be gradual, having no substantial discontinuities so as to provide a minimum impedance to the flow of electrons from the point of creation of electron hole pairs to the point at which electrons finally interact with luminescent centers of activation to cause the emission of visible light.

Additionally, although the operation of the invention has been described with respect to a multiplication of free electrons through a high resistivity phosphor region, and the subsequent excitation of centers of activation by interaction of the freed electrons, it will be appreciated that the same function can be performed as well with positive holes. Thus, when electron-hole pairs are created within the first region of the phosphor, the polarity of the impressed electric field may be arranged to draw positive holes into the intermediate high resistivity phosphor layer causing the creation of an avalanche of positive holes which eventually excite luminescence at the centers of activation.

Furthermore, although the most efficient operation of the invention may be achieved with each of the three regions within the composite phosphor layer specifically chosen to perform a particular function, it is possible to perform the functions of creation of electron-hole pairs, migration of electrons or positive holes under the influence of an applied field, and the subsequent creation of an electron or positive hole avalanche and, finally, the excitation of centers of activation by the electrons or positive holes comprising the avalanche, with only a singular chemically homogeneous phosphor layer. Although such a homogeneous phosphor layer does not perform all functions as efficiently as the hereinbefore-described composite layer, the operation of the system is nevertheless the same. Such a chemically homogeneous layer does, however, have electrical inhomogeneities, due to the crystal lattice defects present at the surfaces of the layer.

In Fig. 8 which shows, in vertical cross-section, a portion of an image intensifying screen comprising a chemically homogeneous phosphor, screen 16 comprises a glass or other transparent plate 17 upon which the other elements of screen 16 are formed. Directly in contact with plate 17 there is located first, a transparent conducting film 18, next a homogeneous photoluminescent phosphor layer 19 and finally, a thin conducting layer 20. Conducting layer 20 may conveniently comprise a conducting layer of titanium dioxide as disclosed in the copending application of Cusano and Studer, Serial No. 243,271, filed August 23, 1951, and assigned to the same assignee as the present invention. According to the method disclosed and claimed in the aforementioned application, a transparent conducting layer of titanium dioxide may be formed upon a refractory or glass surface by a chemical reaction, in a closed space, of titanium tetrachloride and water vapors which are brought into admixture with one another in close juxtaposition to the plate while the latter is heated to approximately 150 to 200° C. Film 4 may have a thickness of about 0.1 micron but may be somewhat thicker.

Photosensitive phosphor film 19 comprises a continuous chemically homogeneous, non-granular film, and may conveniently be a sulphide or a selenide of zinc, cadmium or mixtures of zinc and cadmium, and is activated with approximately 0.1 to 5 percent, by weight, of a luminescence activator which may, for example, be manganese, but for best results is preferably activated with approximately 0.5 to 2 percent, by weight, of manganese. Film 19 may be from 5 to 30 microns thick when used in conjunction with an ultraviolet light source, but should be approximately 25 to 100 microns thick when irradiated with X-rays. This film may be formed by vapor deposition upon a titanium dioxide coated glass plate according to the method disclosed and claimed in the aforementioned application Serial No. 243,271, now Patent No. 2,732,313. As an example of this method, the glass plate coated with the film of titanium dioxide is heated to approximately 500 to 700° C. but preferably to approximately 620° C., and is brought into close contact within an evacuated envelope, with a heated mixture of a vapor of zinc or a zinc compound such as zinc chloride and a gaseous sulfur compound such as hydrogen sulphide gas. The vapor phase reaction is carried in an oxygen-free atmosphere. Such an atmosphere is established by hydrogen sulphide itself where this is the sulfur containing compound used. A suitable zinc containing vapor, for example, metallic zinc or zinc chloride associated with a minor component of a luminescence activator, is supplied in combination with a hydrogen sulphide or other suitable sulfur compound at reaction temperatures in an oxygen-free atmosphere. An activator as, for example, manganese, should be associated in small amounts with the metallic phosphor constituent. Either the zinc or the activator is added as the chloride. Although the role of chlorine in this phosphor is not fully understood, it has been found to be advisable, for proper light emission, that chlorine atoms be present in the phosphor crystal lattice.

The process is carried on at a controlled rate for a preselected period of time and results in the formation of a transparent, homogeneous, non-granular film of zinc or cadmium or zinc cadmium sulphide or selenide activated with the chosen activator element upon the titanium dioxide coated glass plate. The thickness of the deposit is controlled by the length of time the reaction is allowed to continue. For example, with the temperature of the glass at approximately 620° C. and a flow of hydrogen sulphide maintained at a pressure of 1 millimeter of mercury, the gradual addition of 25 g. of zinc, 12.5 g. of $ZnCl_2$ and 0.97 g. of $MnCl_2$ to the evaporation chamber within a period of approximately 45 minutes results in the formation of a uniform film approximately 20 microns thick. The luminescent response of the resultant phosphor may be controlled by a suitable choice of coating atmosphere and activating element, as is done in conventional phosphor preparations. With the deposition from the vapor phase of a layer of activated zinc sulphide or cadmium sulphide or a mixture of zinc and cadmium sulphides or selenides upon titanium dioxide layer 18, the resistivity of the latter is lowered to a value of approximately 1000 ohms per square. This value is very small as compared to the resistance of phosphor layer 5 and suits transparent conducting layer 18 for use as an electrode as is hereinafter described.

After the deposition of phosphor layer 19, a thin coating of a suitable conducting material, having a thickness sufficiently small to be transparent to the incident radiation, is applied over the phosphor layer. Conveniently, conducting coating 20 comprises an easily volatilizable metal as, for example, aluminum, silver or gold. When such metallic films are used, the thickness may be approximately 0.01 micron. Such metal may be deposited by volatilization by well understood methods, as for example, vacuum evaporation.

Photoluminescent screen 16, prepared according to the foregoing process may be used in combination with a source of X-ray or ultraviolet radiation to provide high intensity, X-ray or ultraviolet excited luminescence. A source of unidirectional electrical potential as, for example, battery 21, is connected across phospher layer 19 with transparent conducting film 18 positive and metallic film 20 negative. Unlike conventional suspended powder phosphor films which ordinarily contain a higher concentration of activator, phosphor film 19 does not luminesce under excitation by the applied electric field only. This has been found to be true for values of field strength as high as approximately $10^5$ volts per centimeter. The same phosphor screen, however, is excited to luminescence by impinging X-rays and ultraviolet lights. Thus, under excitation by ultraviolet light of approximately 3650 A.U. a phosphor screen prepared according to the foregoing process and comprising zinc sulphide activated with approximately 1 percent, by weight, of manganese luminesces with a yellow emission in the absence of an applied electric field. When, however, a unidirectional field of the proper polarity is impressed across phosphor layer 5 by connecting transparent conducting layer 4 and metallic conducting layer 6 to a suitable source of unidirectional potential by means of terminals 8 and 9, respectively, the luminescence observed under ultraviolet and X-ray radiation is substantially increased and has been observed to increase as much as a factor of twenty over the unexcited luminescent intensity. In order that this luminescence be obtainable from homogeneous screen 16, the polarity of the applied unidirectional potential must be such that transparent conducting layer 18 be positive and conducting metallic layer 20 be negative.

The embodiment of the invention comprising a chemically homogeneous phosphor film, as described above, is sensitive to ultraviolet and X-ray radiation. Solid state image intensification devices which respond to visible light also constitute a part of the present invention. Such devices may also be illustrated by Fig. 8 of the drawing. In Fig. 8, however, phosphor layer 19 is modified to render it sensitive to visible light. Phosphor layer 19 may be made sensitive to visible light by changing the host phosphor to a mixed phosphor of zinc and cadmium sulphides in which cadmium sulphide comprises from 30% to 100% of the sulphide present. This change reduces the width of the forbidden band of the phosphor energy level diagram as represented in Figs. 3 and 5. The reduced width of the forbidden band reduces the energy distance between the upper and lower activator-induced energy levels. As a result of this reduced distance, the system is responsive to light photons having lower energy, and consequently, longer wavelength. Thus, the light sensitivity of the image intensifier is shifted into the visible spectrum. Alternatively, the sensitivity of the image intensifier represented in Fig. 8 of the drawing may be shifted to the visible spectrum by substituting for chlorine the elements gallium, indium, or iodine in the same weight percentage. While like chlorine, the role of iodine, gallium and indium in the manganese activated zinc sulphide system is not fully understood, manganese activated zinc sulphide having therein a weight percentage of iodine, gallium or indium approximately the same as that of manganese, is sensitive to visible light stimulation in the device of Fig. 8.

Image intensification screens sensitive to visible light and as illustrated in Fig. 8 may be made using either of the above modifications or both. Thus, for example, a screen formed upon a glass plate, having a transparent conducting layer of titanium dioxide 0.1 micron thick having a continuous, non-granular, chemically homogeneous phosphor layer of zinc-cadmium sulphide activated with 1% by weight of manganese, and having a layer of aluminum 0.1 micron thick evaporated thereover was found to respond to, and intensify, visible light images. The phosphor layer of this device was prepared by the vapor deposition method described in the aforementioned Patent No. 2,675,331 using a charge consisting of 10 grams zinc, 5 grams zinc chloride, 15 grams cadmium and 0.3 gram manganese chloride. The reaction was carried on at a temperature of 600° C. in an atmosphere of hydrogen sulphide.

While I have described above certain specific embodiments of my invention, many modifications can be made. It is to be understood, therefore, that I intend, by the appended claims, to include all such modifications as fall within the true spirit and scope of my invention.

What I claim as new and desire to secure by Letters Patent of the United States is:

1. A radiant energy excited luminescence intensification system comprising a source of radiant energy, a luminescent screen which emits visible light when excited by incident radiation from said source, said luminescent screen comprising a continuous non-granular phosphor layer having a gradual continuous variation in bulk electrical resistivity from one surface thereof to the opposite surface thereof, means for directing said incident radiation upon one surface of said layer, and means for impressing a unidirectional electric field between opposite surfaces of said phosphor layer.

2. A radiant energy excited luminescence intensification system comprising a luminescent screen which emits visible light when excited by incident radiation, said luminescent screen comprising a continuous, non-granular phosphor layer having a gradual continuous variation in bulk electrical resistivity from one surface thereof to the opposite surface thereof, a thin transparent conducting layer contacting one surface of said phosphor layer, a thin metallic conducting surface contacting the opposite surface of said layer, said metallic layer being radiation transparent, and means for applying a unidirectional electrical potential between said conducting layers.

3. A radiant energy excited luminescence intensification system comprising a luminescent screen which emits visible light when excited by incident radiation, said luminescent screen consisting of a continuous non-granular phosphor layer having a monotonic gradual variation in electrical properties from one surface thereof to the opposite surface thereof, means for directing said incident radiation upon one surface of said layer, and means for impressing a unidirectional electrical potential between the surfaces of said layer.

4. In a radiant energy excited luminescence intensification system including a source of radiant energy and means for directing said radiant energy upon a luminescent screen, the improvement of which comprises a luminescent screen which emits visible light when excited by incident radiation, said luminescent screen consisting of a continuous non-granular phosphor layer having a gradual continuous variation in bulk electrical resistivity from one surface to the opposite surface thereof, and means for impressing a unidirectional electric field between opposide surfaces of said phosphor layer.

5. In a radiant energy excited luminescence intensification system including a source of radiant energy and means for directing said radiant energy upon a luminescent screen, the improvement of which comprises a luminescent screen which emits visible light when excited by incident radiation and consisting of a continuous non-granular phosphor layer having a gradual continuous variation in bulk resistivity from one surface thereof to an opposite surface thereof, a thin transparent conducting layer contacting one surface of said phosphor layer, a thin metallic conducting surface contacting the opposite surface of said phosphor layer and means for applying a unidirectional electrical potential between said conducting layers.

6. A radiant energy excited luminescence intensification system comprising a luminescent screen which emits visible light when excited by incident radiation, said luminescent screen comprising a continuous non-granular phosphor layer including a first region of low resistivity adjacent one surface of said layer, a second region of low resistivity adjacent the opposite surface of said layer, and a third region of high resistivity intermediate and contiguous with said first and second regions of low resistivity, the variation in electrical resistivity between said high resistivity region and said low resistivity regions being gradual and continuous, and means for impressing a unidirectional electric field between opposite surfaces of said layer.

7. A luminescence intensification screen comprising a continuous non-granular cathodoluminescent phosphor layer including a first region of low resistivity adjacent one surface of said layer and comprising zinc sulphide impregnated with a maximum of 0.3% by weight each of silver and chlorine, a second region of low resistivity adjacent the opposite surface of said layer and comprising zinc sulphide impregnated with a maximum of 0.3% by weight each of copper and chlorine, a third region of high resistivity intermediate and contiguous with said first and second regions of low resistivity, the variation in electrical resistivity between said high resistivity and said low resistivity regions being gradual and continuous, and means for impressing an electric field between opposite surfaces of said layer.

8. An X-ray excited luminescence intensification device comprising an X-radiation sensitive luminescent screen comprising a single crystal layer of zinc sulphide having a first region of low resistivity adjacent one surface of said layer comprising zinc sulphide impregnated with a maximum of 0.3% by weight each of silver and chlorine, a second region of low resistivity adjacent the opposite surface of said layer and comprising zinc sulphide impregnated with a maximum of 0.3% by weight each of copper and chlorine, and a third region of high resistivity zinc sulphide intermediate and contiguous with said first and second regions of low resistivity, the variations in electrical resistivity between said high resistivity and said low resistivity regions being gradual and continuous, and means for impressing an electric field between opposite surfaces of said layer.

9. A visible light excited luminescence intensification system comprising a visible light sensitive luminescent screen comprising a continuous, non-granular phosphor layer including a first region of low resistivity adjacent one surface of said layer and comprising cadmium sulphide impregnated with a maximum of 0.3% by weight each of silver and chlorine, a second region of low resistivity adjacent the opposite surface of said layer and comprising zinc sulphide impregnated with a maximum of 0.3% by weight each of copper and chlorine and a third region of high resistivity intermediate and contiguous with said first and second regions comprising a mixture of zinc and cadmium sulphide crystals, the variation in electrical resistivity between said high resistivity and said low resistivity regions being gradual and continuous, and means for impressing an electric field between opposite surfaces of said layer.

10. A cathodoluminescence intensification screen comprising a continuous, non-granular layer including a first region of low resistivity adjacent one surface of said layer and comprising zinc sulfide impregnated with a maximum of 0.3% by weight of a material selected from the group consisting of silver, gold and zinc, and 0.3% by weight of a material selected from the group consisting of chlorine, bromine, iodine, gallium and indium, a second region of low resistivity adjacent the opposite surface of said layer and comprising zinc sulfide impregnated with a maximum of 0.3% by weight of a material selected from the group consisting of copper, phosphorus, arsenic, antimony and 0.3% by weight of a material selected from the group consisting of chlorine, bromine, iodine, gallium and indium, a third region of high resistivity intermediate and contiguous with said first and second regions of low resistivity, the variation in electrical resistivity between said high resisivity and said low resistivity regions being gradual and continuous, and means for impressing an electric field between opposite surfaces of said layer.

11. An X-ray excited luminescence intensification screen comprising a single crystal layer of zinc sulfide having a first region of low resistivity adjacent one surface of said layer and comprising zinc sulfide impregnated with a maximum of 0.3% by weight of a material selected from the group consisting of silver, gold and zinc, 0.3% by weight of a material selected from the group consisting of chlorine, bromine, iodine, gallium and indium, a second region of low resistivity adjacent the opposite surface of said layer and comprising zinc sulfide impregnated with a maximum of 0.3% by weight of a material selected from the group consisting of copper, phosphorus, arsenic, antimony and manganese and 0.3% by weight of a material selected from the group consisting of chlorine, bromine, iodine, gallium and indium, and a third region of high resistivity zinc sulfide material intermediate and contiguous with said first and second regions of low resistivity, the variations in electrical resistivity between said high resistivity and said low resistivity regions being gradual and continuous, and means for impressing an electric field between opposite surfaces of said layer.

12. A visible light excited luminescence intensification screen comprising a continuous non-granular phosphor layer including a first region of low resistivity adjacent one surface of said layer and comprising cadmium sulfide impregnated with a maximum of 0.3% by weight of a material selected from the group consisting of silver, gold and zinc and 0.3% by weight of a material selected from the group consisting of bromine, chlorine, iodine, gallium and indium, a second region of low resistivity adjacent the opposite surface of said layer and comprising zinc sulfide impregnated with a maximum of 0.3% by weight of a material selected from the group consisting of copper, phosphorus, arsenic, antimony and manganese and 0.3% by weight of a material selected from the group consisting of chlorine, bromine, iodine, gallium and indium, and a third region of high resistivity intermediate and contiguous with said first and second regions comprising a mixture of zinc and cadmium sulfide crystals, the variation in electrical resistivity between said high resistivity and said low resistivity regions being gradual and continuous, and means for impressing an electric field between opposite surfaces of said layer.

13. A radiant energy excited luminescence intensification system comprising a source of radiant energy, a luminescent screen which emits visible light when subjected to said radiant energy and comprising a continuous homogeneous, non-granular phosphor film composed of zinc sulfide activated with approximately 0.5 to 2 percent, by weight, of manganese and 0.001 to 0.3 percent by weight of a material selected from the group consisting of iodine, indium and gallium, a transparent conducting film contacting one surface of said film, a thin metallic conducting film contacting the opposite surface of said film, means for directing said radiant energy through said metallic film and upon said phosphor film and means for applying a unidirectional electrical potential between said transparent film and said metallic film.

14. A radiant energy excited luminescence intensification system comprising a source of radiant energy, a luminescent screen which emits visible light when subjected to said radiant energy and comprising a continuous, homogeneous, non-granular phosphor film composed of 0 to 70% by weight of zinc sulfide, 0.5 to 2% by weight of manganese, 0.001 to 0.3% by weight of a material selected from the group consisting of iodine, indium and gallium, the remainder being cadmium sulfide, a transparent conducting film contacting one surface of said film, and a thin, conducting metallic film transparent to radiation contacting the opposite surface of said film, means for directing said radiant energy through said metallic film and upon said phosphor film and means for impressing an electric field between opposite surfaces of said layer.

References Cited in the file of this patent

UNITED STATES PATENTS

| | | |
|---|---|---|
| 2,447,851 | Fonda | Aug. 24, 1948 |
| 2,660,566 | Froelich | Nov. 24, 1953 |
| 2,698,915 | Piper | Jan. 4, 1955 |
| 2,733,367 | Gillson | Jan. 31, 1956 |
| 2,755,406 | Burns | July 17, 1956 |
| 2,780,731 | Miller | Feb. 5, 1957 |